Figure 2:
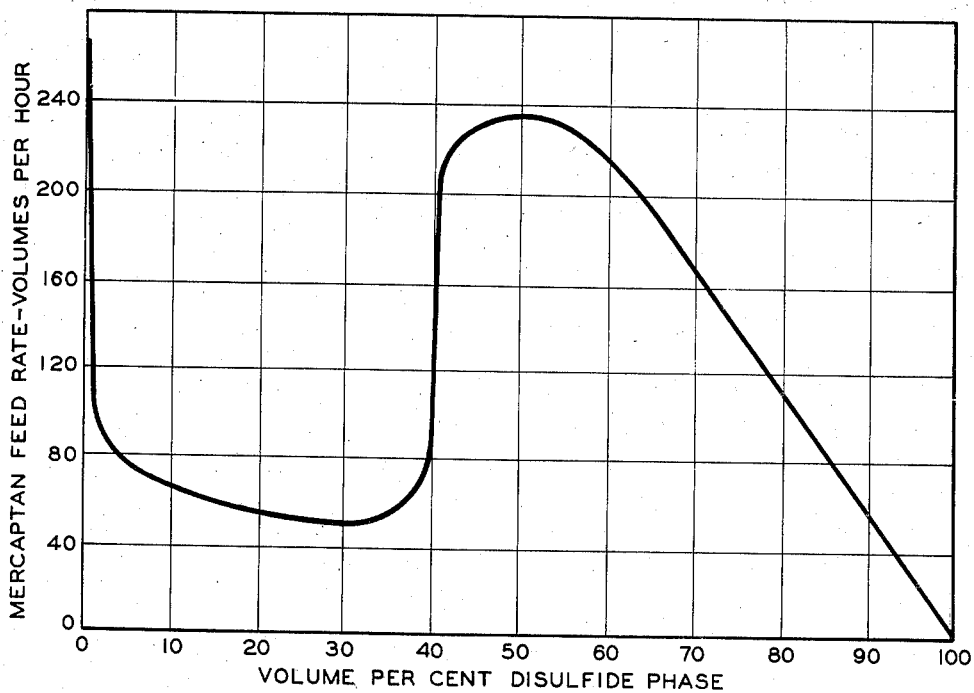

June 17, 1958 P. F. WARNER 2,839,581
LIQUID REAGENT DISULFIDE PROCESS
Filed July 31, 1956

INVENTOR.
P. F. WARNER
BY
Hudson & Young
ATTORNEYS

United States Patent Office 2,839,581
Patented June 17, 1958

2,839,581

LIQUID REAGENT DISULFIDE PROCESS

Paul F. Warner, Phillips, Tex., assignor to Phillips Petroleum Company, a corporation of Delaware Application July 31, 1956, Serial No. 601,272

16 Claims. (Cl. 260—608)

This invention relates to the oxiation of mercapto-substituted organic compounds to their corresponding disulfides. In one aspect, the invention relates to the oxidation of organic mercaptans to the corresponding disulfides, employing an oxidizing reagent comprising a solution of cupric halide in an organic solvent containing water. In still another aspect, the invention relates to a method for maintaining high reaction and regeneration rates by maintaining the ratio of the product disulfide phase to the oxidizing reagent solution phase within certain specified limits. In another aspect, the invention relates to maintaining a high reaction rate and a high oxidizing reagent regeneration rate by maintaining the disulfide product phase as the continuous phase and, when so doing, maintaining the ratio of the product disulfide phase to the reagent solution phase such that the disulfide phase is within the limits from 30 to 85 volume percent. In another aspect, the invention relates to maintaining a high reaction rate and a high oxidizing reagent regeneration rate by maintaining the reagent solution as the continuous phase while keeping the disulfide content thereof below about 2 and preferably not more than 1 percent during reaction and regeneration.

It is an object of the invention to provide a process for the oxidation of mercapto-substituted organic compounds to their corresponding disulfides. It is another object of the invention to increase the rate of regeneration of an oxidizing reagent solution comprising a solution of a cupric halide in an organic solvent containing water being employed for the oxidation of mercapto-substituted organic compounds to their corresponding disulfides. It is another object in such an oxidation reaction to maintain a high activity of the oxidizing reagent.

Other aspects, as well as objects and advantages of the invention, are apparent from this disclosure, the drawing and the claims.

The well-known liquid reagent copper-sweetening process for oxidizing to disulfides small concentrations of mercaptans contained in hydrocarbons is adaptable to the preparation of disulfides from starting materials containing organic mercaptans in a more highly concentrated state. The principal reactions involved are illustrated in the following equations:

(1) $2CuCl_2 + 4RSH \rightarrow 2R\text{---}S\text{---}Cu + R\text{---}S\text{---}S\text{---}R + 4HCl$

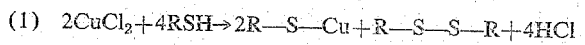
Cupric   Mer-   Cuprous        Disulfide Hydrochloric
chloride captan mercaptide                     acid (2) $2R\text{---}S\text{---}Cu + 2CuCl_2 \rightarrow R\text{---}S\text{---}S\text{---}R + 4CuCl$

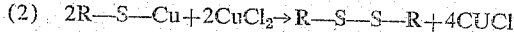
Cuprous   Cupric   Disulfide   Cuprous
mercaptide chloride                  chloride In the first step of the reaction Equation 1 one-half of the mercaptan is converted to the corresponding dissulfide and the rest is left as cuprous mercaptide. The latter then reacts (as shown in Equation 2) with additional cupric chloride to give the corresponding disulfide and cuprous chloride. On combining the two equations into one, the ultimate reaction is:

(3) $4CuCl_2 + 4RSH \rightarrow 2R\text{---}S\text{---}S\text{---}R + 4CuCl + 4HCl$

Cupric   Mer-     Disulfide    Cuprous   Hydro-
chloride captan                        chloride  chloric
                                                                acid Since cuprous chloride and hydrochloric acid are formed in the reaction at the expense of the cupric chloride, the reagent will gradually lose its activity and finally become spent. The reagent is consequently regenerated by oxidation with air or other fluid containing free oxygen. Thus, the cuprous chloride and hydrochloric acid, formed as above shown in the sweetening step, react with oxygen to give cupric chloride and water (as shown in Equation 4):

(4) $4CuCl + 4HCl + O_2 \rightarrow 4CuCl_2 + 2H_2O$

Cuprous  Hydro-  Oxygen  Cupric   Water
chloride  chloric                chloride
         acid When reacting a mercaptan rich stock to prepare dissulfides from mercaptans by oxidation by direct application of the copper sweetening process to feed stocks containing high concentrations of mercaptans (i. e., stocks containing 50 weight percent or higher, especially those stocks containing 90 percent or more organic mercaptans), cuprous mercaptides are formed in such a concentration that they precipitate from the reaction mixture. As shown by the equations above, for reaction (2) to proceed satisfactorily it is necessary for the cuprous mercaptide to remain dissolved in the reaction mixture in order to provide for the proper contacting of the reactants with the oxidizing agent. Thus, it has been found that it is desirable to employ a reaction medium in which the reactants, including cuprous mercaptide, have a relatively high degree of solubility.

Thus, it has been found that disulfides can be produced in economically significant quantities employing a cupric halide as the oxidant, utilizing a charge stock containing organic mercaptans in any desired concentration. This is accomplished by effecting the oxidation in an organic solvent containing water in which the cupric halide oxidant, the intermediate compounds and the mercaptan reactants are soluble. Examples of such a process are disclosed and claimed in U. S. 2,503,644, to P. F. Warner and J. A. McBride.

Any organic solvent is useful as long as it meets the foregoing criteria and is not adversely reactive under the oxidizing or the regenerating conditions employed, i. e., the solvent is an organic compound not adversely chemically affected or decomposed under such conditions. Preferably the solvent employed is not reactive or chemically affected, i. e., is chemically inert, under the oxidizing and the regenerating conditions. A further requirement is that it must be capable of dissolving water. Solvents containing only carbon, hydrogen, and oxygen are a preferred class.

Very suitable organic solvents for this purpose have been found to be the monoalkyl glycol ethers wherein the alkyl contains preferably not more than 6 to 8 carbon atoms and wherein said glycol is preferably ethylene glycol, diethylene glycol, propylene glycol, dipropylene glycol, or even higher glycols, if desired.

Such a process, utilizing a cupric halide dissolved in an organic solvent containing water, has been proved to be a very efficient and effective method of oxidizing organic mercaptans, and has been commercially and economically employed to produce disulfides from mercaptan feed stocks of 90 percent and higher concentrations. It has been possible to utilize the same copper solution repeatedly, or continuously, for long periods of time, using only regeneration with air to maintain a high level of catalyst activity.

Commercial operation of such a process to produce disulfides has been effected under such conditions that the ratio of disulfide phase to reagent phase has been such that the disulfide phase comprised about 5 to 10 percent of the total mixture. It has now been unexpectedly found that control of the ratio of disulfide phase to reagent phase in the reaction mixture can increase the reaction rate by 4 or 5 times or more.

According to my invention, there is provided in a process for the oxidation of mercapto-substituted organic compounds to the corresponding disulfides in the presence of an oxidizing reagent comprising a solution of a cupric halide in an organic solvent containing water, the improvement which comprises maintaining the ratio of the disulfide phase to the reagent phase such that the disulfide phase during regeneration of the reagent, comprises not more than 2 and preferably not more than 1 volume percent of the combined reaction mixture of product and reagent phases when the reagent phase is the continuous phase, or comprises between 30 and 85 volume percent of the reaction mixture when the disulfide phase is the continuous phase. Preferably this range is 35 to 70.

In accordance with the process with which my invention is concerned, I utilize a charge stock containing a selected organic mercapto substituted compound in any desired concentration for oxidation to the corresponding disulfide. Mercaptan compounds are considered herein to comprise those having the general formula RSH, wherein R is an organic radical, usually an alkyl, aryl, aralkyl, alkaryl or cycloaliphatic radical. Usually, said aryl, aralkyl, alkaryl, alkyl and cycloaliphatic radical contains a maximum of 12 carbon atoms. Charge stock is introduced to an oxidation zone containing an oxidizing solution at a maximum temperature of 175° F., preferably in the range of 80°–160° F. Oxidizing solutions referred to herein comprise a copper halide dissolved in one or more organic solvents, as previously described, such as the glycol ether solvents above mentioned. The oxidizing solution contains cupric ions and halide ions, which halide ions are preferably chloride ions and/or bromide ions (although any of the halides can be used), and although it may comprise an admixture of a soluble cupric chloride, and/or soluble cupric bromide with an organic solvent, e. g., a glycol ether, and water, it is not limited thereto. Thus, the oxidizing solution may comprise an admixture of a soluble cupric salt, a soluble chloride and/or bromide salt with the organic solvent in water, the essential element being the presence of cupric ions and chloride and/or bromide ions. Water concentrations in the oxidizing solution, usually in the range of 3 to 30 percent can be utilized, although usually the preferred range is 5 to 20 percent. Higher water concentrations than 30 percent and lower concentrations than 3 percent are within the scope of the claimed invention. For example, an oxidizing solution can comprise cupric chloride dihydrate and a glycol ether solvent with or without additional water, the amount of water present usually not exceeding about 20 weight percent. On the other hand, an oxidizing solution can comprise cupric sulfate, ordinary sodium chloride, water in the preferred concentration of 5 to 20 weight percent, and one of the glycol ether solvents mentioned.

Conversion of mercaptans to the corresponding disulfide product is substantially instantaneous and complete. Oxidizing solution is usually regenerated (i. e., cuprous halide is oxidized) by passing a stream of air or equivalent oxygen-containing gas through the partially spent solution either in situ or in a regeneration zone external to the oxidation zone. Oxidizing solution and disulfide product are recovered from the effluent of the oxidation zone and the former is recycled to the oxidation zone.

The water content is preferably below about 30 percent and above 3 percent of the weight of the total reagent solution. Water in the copper halide-organic reagent solution is, of course, employed because of its function as an intermediate ion carrier, and the choice of the particular value of the concentration within the limits between about 3 to 30 percent depends largely on the adjustment of the solubility of the reagent solution for an optimum balance between its solubility for the reactants and its solubility for the reaction products produced, keeping in mind that cuprous mercaptide precipitation is to be avoided. This is why there is a maximum concentration of water which can be tolerated in each particular instance. As shown in Equation 4, water is obtained as a by-product of regeneration. Accordingly, by-product water must be removed from the oxidizing solution so as to maintain its concentration in the oxidizing solution in the oxidation zone in a range such that the reagent solution has the desired solvent properties. Complete removal of water from the oxidation zone is undesirable for reasons already discussed. I prefer in most instances to remove regeneration by-product water from the system at such a rate as to maintain a concentration of water in the oxidation zone in the range of 3 to 30 percent by weight of the total oxidizing reagent solution.

The oxidizing solution is necessarily regenerated for the reasons discussed hereinbefore. Oxidizing solution in effluent from the oxidation zone is partially spent to an extent that in most instances the cupric reagent is in a state of about 90 percent reduction. Satisfactory rates of conversion of mercaptans in the oxidation zone can be maintained when regenerating the partially spent oxidizing solution to an oxidized state of about 90 percent. Although a higher state of oxidation can be effected, the presence of some reduced ions is preferred since in such cases there appears to be no evidence of peroxide formation. The rate of regeneration can be controller by varying the rate at which the oxygen-containing gas flows through the reagent solution. The temperature is preferably kept below 175° F. in order to avoid the formation of insoluble copper compounds which are of no value in the oxidation zone.

The removal of excess by-product water of the regeneration can be effected by means of the excess air or other oxygen-containing gas passing through the solution during the regeneration step where a separate regeneration step is employed. The efficiency of the removal of water from the regeneration zone is, of course, dependent upon the required regeneration conditions of temperature and flow of regeneration gas.

When a flow of air 300 percent in excess of the theoretical amount required for regeneration is employed, complete removal of excess by-product water from the oxidizing solution is effected. However, when employing 100 percent excess air flow only about 50 percent of the required removal of by-product water is effected. By-product water can also be removed when a separate regeneration step is employed, with the aid of an introduction of a paraffin hydrocarbon boiling in the range of about 140 to 160° F. to the regeneration system usually in a ratio in the range of 1:1 to 1:3 to the mercaptan oxidized, depending upon the amount of excess air and other particular conditions. For instance normal hexane can be used, and passes overhead with the excess air and by-product water. This latter method of water removal can be employed when the organic solvent employed in the process is one which forms a non-azeotrope mixture with water, e. g., the monomethyl ether of diethylene glycol.

Figure 1:
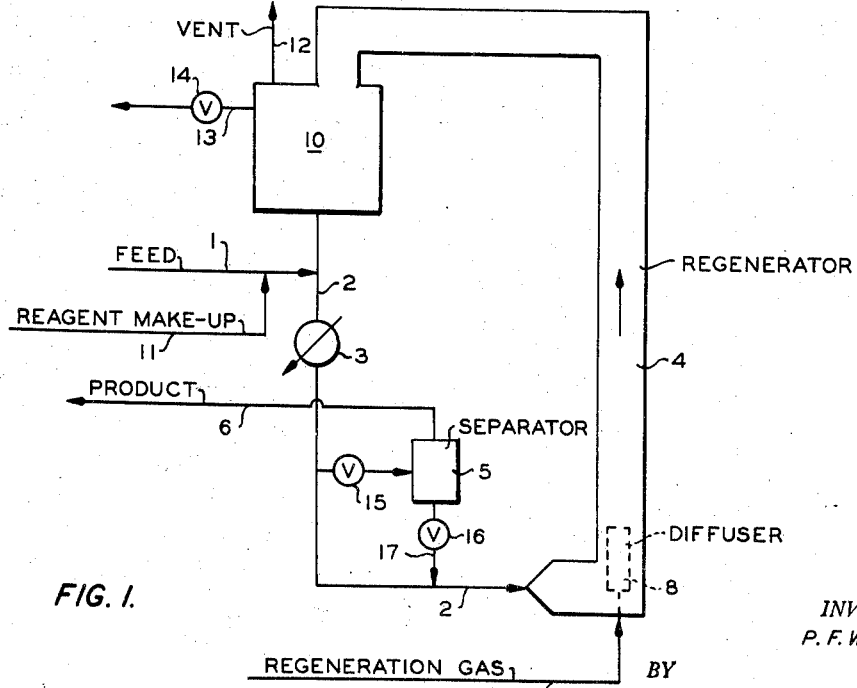

Figure 1 illustrates a presently preferred method of effecting the present process. In the description of the drawing, valves, pumps, heat exchangers, controls and other auxiliary equipment are not shown, although some valves are shown as an aid to discussion and description of the drawing.

Referring now to the drawing, the feed, a mercapto-substituted organic compound, e. g., tertiary butyl mercaptan is introduced continuously through line 1 to line 2 where it mixes with reaction mixture flowing in line 2. The combined reaction mixture flows through heat exchanger 3 and is then introduced to regeneration zone 4. However, a portion of the material flowing in line 2 is taken as a slip stream into separator 5, in which the product disulfide phase is separated from the oxidizing reagent solution phase, the latter being returned to line 2 before introduction into regeneration zone 4, and the product phase being separated in 5 being withdrawn through line 6 to any final purification desired. The mixture in line 2, which enters the bottom of zone 4, contains the oxidizing reagent solution, such as a solution of cupric chloride in diethylene glycol monomethyl ether containing water, as described herein, in one phase and, in the other phase, there is contained disulfide resulting from the oxidation of the mercapto-substituted organic compound. As discussed hereinbefore, there are both cupric and cuprous ions in the reagent solution. Air is introduced into the regeneration zone through line 7 and diffusing means 8 in order to oxidize the cuprous ions in the reagent. After the introduction of the compound to be oxidized through line 1 into line 2, oxidation is practically complete and almost instantaneous, so that there is substantially no mercapto-compound in regeneration zone 4. The reagent-disulfide mixture passes through 4 in a state of agitation with the air and then into accumulator 10. From accumulator 10 is vented the major portion of the air, together with some water, as before discussed. Make-up reagent, including any necessary acids, such as HCl or HBr, is added to line 1 intermittently as needed through line 11. In one embodiment of the process, the ratio of disulfide phase to reagent phase in the system is maintained such that the disulfide phase comprises between 30 and 85 volume percent of the reaction mixture and, at the same time, the disulfide phase is maintained as the continuous phase. In such embodiment, vessel 10 acts mainly as a drum from which the air containing some water can be vented (as through line 12). Thus, no separation of phases is effected in such embodiment in accumulator 10. In another embodiment of the invention, the ratio of the disulfide phase to the oxidizing reagent phase in the regenerator is maintained such that the disulfide phase comprises not more than 2 and preferably not more than 1 percent of the mixture. In such embodiment, the reagent phase is, of course, the continuous phase. In this latter embodiment, zone 10 can further serve to allow settling of the two phases, with removal of product disulfide phase being effected through line 13 by opening valve 14. In this embodiment, product is taken through line 13 to any desired further purification. Alternatively, a major portion, and preferably all, of the reaction mixture is passed to separator 5 wherein the disulfide and reagent phases are at least partially separated, the disulfide being removed through line 6 to product storage or further purification if desired, and the reagent being returned to line 2 through line 17. It is preferred that the reagent phase entering the regenerator be substantially free of disulfide. Separator 5 can be any suitable separation means such as a phase separator which will produce a low concentration of disulfide in the reagent phase.

In a specific example of my invention, valves 15 and 16 remain open, while valve 14 is closed, and the ratio of disulfide phase to reagent phase is maintained at about 2 parts to 1 part by volume, the disulfide phase being the continuous phase. The feed is a somewhat impure tertiary butyl mercaptan having a density of about 0.8044, the feed rate is about 6 gallons per hour, the reagent is a solution of copper chloride and diethylene glycol monomethyl ether containing about 5 percent water. About 700 S. C. F./hour of air is introduced into catalyst regeneration zone 4 through line 7 and diffuser 8. The temperature in the system is maintained within the range, through-out the system, of from about 140 to 160° F. About 5.1 gallons per hour of tertiary butyl disulfide having a specific gravity of 0.9318 is produced through line 6, the stated specific gravity being after final purification. The reagent phase previously separated in zone 5, amounting to about one-third of the volume of the disulfide phase produced, is returned to line 2.

Figure 2 illustrates the effect of reagent phase-disulfide phase ratio on the feed rate when oxidizing tertiary butyl mercaptan in the processes of the invention as outlined in the discussion of Figure 1. The feed rate, of course, is limited by the rate of regeneration.

As will be evident to those skilled in the art, various modifications of this invention can be made or followed in the light of the foregoing disclosure and discussion without departing from the spirit or scope of the disclosure or from the scope of the claims.

I claim:

1. In a process for the oxidation of a mercaptan containing a single SH group to the corresponding disulfide in the presence of a separate oxidizing reagent phase comprising a solution of a cupric halide in an organic solvent containing 3 to 30 weight percent water dissolved therein, the improvement which comprises maintaining a volume ratio of the product disulfide phase to the said reagent phase during regeneration of said reagent with a free oxygen-containing gas, between 30:70 and 85:15, the disulfide phase being the continuous phase.

2. In a process which comprises oxidizing a mercaptan containing a single SH group to the corresponding disulfide in the presence of a separate oxidizing reagent phase comprising a solution of at least one cupric halide selected from the group consisting of cupric chloride and cupric bromide in an organic solvent together with 3 to 30 percent of water dissolved therein, and regenerating the reagent with an oxygen-containing gas; the improvement which comprises maintaining a volume ratio of the product disulfide phase to the said reagent phase, during regeneration of said reagent with a free oxygen-containing gas, between 30:70 and 85:15, the disulfide phase being the continuous phase.

3. An improvement of claim 2 wherein the temperature is maintained during said reaction within the range from 80 to 175° F.

4. An improvement of claim 2 in which the solvent is a monoalkyl glycol ether, wherein said alkyl contains not more than 8 carbon atoms.

5. An improvement of claim 1 wherein said solvent is a monoalkyl glycol ether wherein said alkyl contains not more than 8 carbon atoms.

6. An improvement of claim 5 wherein said glycol is selected from the group consisting of ethylene glycol, diethylene glycol, propylene glycol and dipropylene glycol.

7. An improvement of claim 1 wherein the said cupric halide is at least one of the halides selected from the group consisting of cupric chloride and cupric bromide.

8. An improvement of claim 2 wherein said mercaptan is an alkyl mercaptan.

9. An improvement of claim 2 wherein the said ratio is between 35:65 and 70:30.

10. An improvement of claim 2 wherein said chloride is cupric chloride, said mercaptan is tertiary butyl mercaptan, and said organic solvent is diethylene glycol monomethyl ether.

11. In a process for the oxidation of a compound of the formula RSH wherein R is selected from the group consisting of an alkyl, aryl, aralkyl, alkaryl and cycloaliphatic radical, to the corresponding disulfide in the presence of a separate oxidizing reagent phase comprising a solution of a cupric halide selected from the group consisting of cupric bromide and cupric chloride in an organic solvent containing 3 to 30 weight percent water dissolved therein, the improvement which comprises maintaining a volume ratio of the product disulfide phase to the said reagent phase, during regeneration of said reagent with a free oxygen-containing gas, between 30:70 and 85:15, the disulfide phase being the continuous phase.

12. An improvement according to claim 11 wherein said radical contains a maximum of 12 carbon atoms.

13. An improvement of claim 7 wherein said mercaptan contains a maximum of 12 carbon atoms.

14. An improvement of claim 2 wherein said amount of water is in the range from 3 to 20 weight percent.

15. An improvement according to claim 8 wherein said alkyl mercaptan contains a maximum of 12 carbon atoms.

16. An improvement of claim 15 wherein said organic solvent is a monoalkyl glycol ether, wherein said alkyl contains not more than 8 carbon atoms.

References Cited in the file of this patent

UNITED STATES PATENTS

| | | |
|---|---|---|
| 2,415,851 | Schulze et al. | Feb. 18, 1947 |
| 2,421,545 | Crouch | June 3, 1947 |
| 2,457,635 | Bond | Dec. 28, 1948 |
| 2,503,644 | Warner et al. | Apr. 11, 1950 |